A. J. SHUCK & B. F. WILDMAN.
Hay and Cotton Press.
No. 198,224.        Patented Dec. 18, 1877.
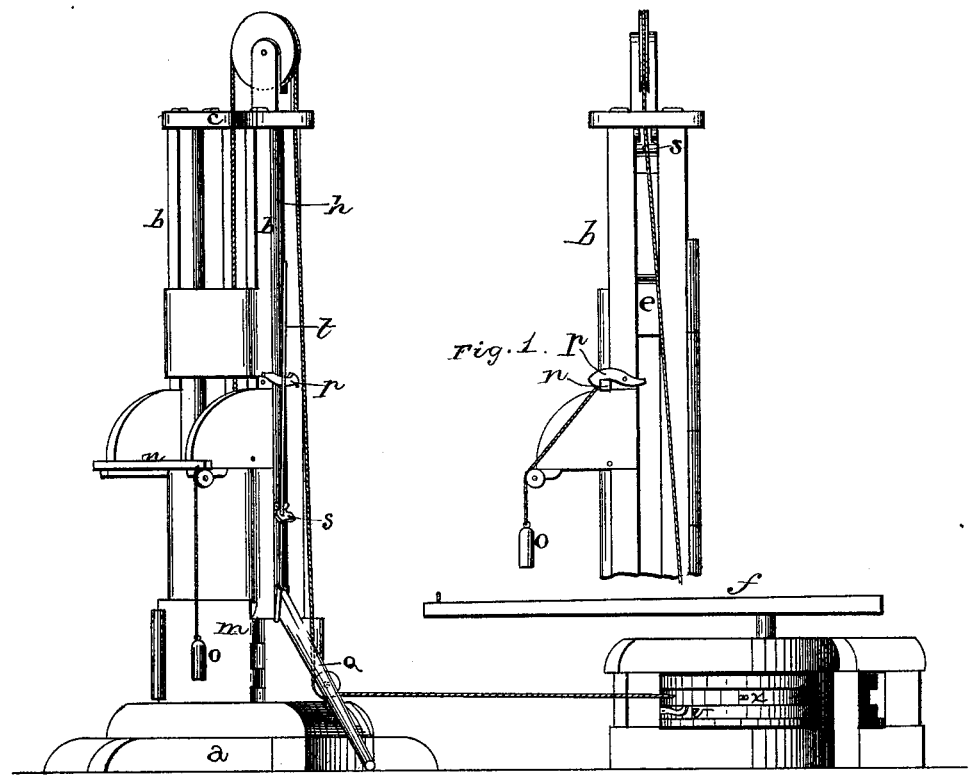
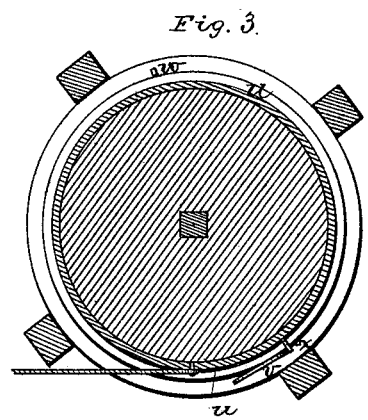
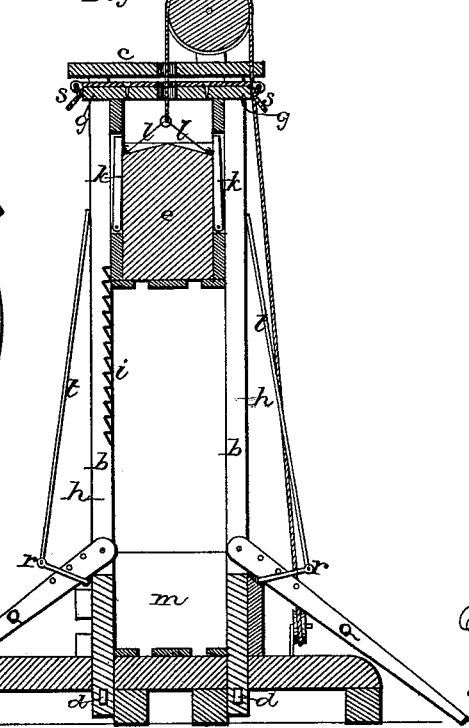
WITNESSES:
INVENTORS
A. J. Shuck,
B. F. Wildman,
per F. A. Lehmann,
Atty.

UNITED STATES PATENT OFFICE.

ANDREW J. SHUCK, OF JENNINGS COUNTY, AND BENJAMIN F. WILDMAN, OF RIPLEY COUNTY, INDIANA.

IMPROVEMENT IN HAY AND COTTON PRESSES.

Specification forming part of Letters Patent No. 198,224, dated December 18, 1877; application filed October 26, 1877.

*To all whom it may concern:*

Be it known that we, ANDREW J. SHUCK, of Jennings county, and BENJ. F. WILDMAN, of Ripley county, and State of Indiana, have invented certain new and useful Improvements in Hay and Cotton Presses; and we do hereby declare the following to be a full, clear, and exact description of the invention, such as will enable others skilled in the art to which it pertains to make and use it, reference being had to the accompanying drawings, which form part of this specification.

The nature of our invention relates to an improvement in hay and cotton presses; and it consists in the peculiar construction and arrangement of parts, whereby either hand or horse power can be employed, and whereby a simple, cheap, and rapid machine is produced, as will be more fully described hereinafter.

The accompanying drawings represent our invention.

$a$ represents the sill of the press, which is supported some little distance above the ground, in any suitable manner. Through this sill the lower ends of the standards $b$ are passed, and are secured by means of the keys $d$. These standards extend upward to the height of the press, forming the ends thereof, and have their upper ends passed through the cap $c$. The sides of the press between the standards are inclosed, as shown, and have on each side of the base a door, $m$, by means of which the bale is hooped and taken out. On the outer side of the press, at a convenient height from the base, is a door, $n$, which is used in feeding hay or cotton to the press.

Fitting closely inside the press is a beater, $e$, which is raised by means of a rope or chain which passes over a pulley on the top of the press, and under another on the outside of the press, at its sill, and from thence to the horse-power $f$. The top of the beater is provided with ears $g$, which extend through a slot, $h$, cut in each of the standards $b$. On the inside of each of the standards $b$ is cut a series of notches, $i$, on opposite sides of the slots $h$, into which notches the pivoted dogs $k$ catch, with which the beater is provided. The upper ends of these dogs $k$ are connected by means of the rods $l$, and to an eye or ring, which connects the ends of these rods, the rope is fastened which serves to raise the beater.

The door $n$, on the side of the press, is pivoted at its lower edge, and to its upper edge is attached a weight, $o$, by means of a rope or cord, which weight serves to open the door when the catches $p$ on its upper edge are released.

Pivoted in each of the slots $h$, near their inner ends, are the clevises $r$, which are adjusted either outwardly or inwardly by means of a series of holes in each of the levers, and held in position by means of a pin. By adjusting the clevis inward a longer stroke of the lever and more power is obtained, and by moving the clevis outward from the press the opposite result is accomplished.

On the upper side of the ends of the projecting ears $g$ of the beater are the hinged plates or rings $s$, through which pass the rods $t$, which are pivoted in the upper ends of the clevises $r$, as shown in Fig. 1.

In order to release the beater $e$ when it has been raised to the top of the press, the drum of the horse-power $f$ is provided with a sliding ring or strap, $u$, to the outer side of which one end of the rope which raises the beater is secured. Immediately in front of the place where the rope is secured, a pin or other projection, $x$, is affixed, and behind this pin is pivoted a dog, $v$, on the lower edge of the drum, which extends beyond the strap $u$. The upper end of this dog $v$ rests immediately behind the pin on the strap $u$, thus causing the strap to revolve with the drum. The drum is made large enough to raise the beater by somewhat less than a single turn, and on the other side of the base upon which the drum rests, from where the dog is attached, is placed a projection, $w$. The drum revolves, raising the beater until the dog $v$ reaches the projection $w$ on the opposite side of the base, when the projection raises the lower end of the dog, which causes the upper end to release the pin $x$, and the beater descends of its own weight.

The horse-power may be taken apart, so as to be rendered portable, by putting it together with pins, wedges, or other equivalent mechanical devices.

In baling hay or cotton, the operation of our press is as follows: Having raised the beater $e$, the door $n$ is opened, and through it a quantity of hay is thrown into the press, the lower doors $m$ having previously been closed. The door $n$ is closed, and the beater $e$ is then permitted to descend. The projecting ears $g$ strike against the ends of the latches $p$, causing them to fall backward over the slots $h$ so as to release the door, the door $n$ being opened by means of the weight $o$. The beater being again raised, some more hay is thrown in and the door closed, when the beater descends as before. This operation is repeated until sufficient hay has been thrown in to form a bale, when the horse-power is suspended. The rods $t$ are then passed through the rings or plates $s$, which are not horizontal but slanted several degrees downward, and as the holes in the rings or plates $s$ are somewhat larger than the rods $t$, they readily move through the plates when the levers $q$ are raised; but any attempt to lower them causes the rings, and, consequently, the beater to which they are attached, to descend with them. The dogs $k$ fall into the notches $i$ on the insides of the standards, thus preventing the hay from springing the beater $e$ up when the levers are raised in order to get a new hold. The hand-levers are used until the hay has been sufficiently compressed, when the doors $m$ are opened and the bale hooped and taken out.

Having thus described our invention, we claim—

1. The combination of the slotted standards $b$, beater $e$, hand-levers $q$, ratchet-teeth $i$, rings or plates $s$, and rods $t$, substantially as described.

2. In a hay or cotton press a beater, $e$, provided with projecting ears $g$, having plates or rings $s$, and pivoted dogs $k$, whereby the beater is prevented from ascending by the pressure of the hay, substantially as shown.

3. A hinged door, $n$, provided with a weight, $o$, in combination with the beater, slotted standards, and latches $p$, whereby the door is opened, when the beater rises upward and releases the latches, substantially as specified.

In testimony that we claim the foregoing we have hereunto set our hands this 17th day of October, 1877.

ANDREW J. SHUCK.
BENJAMIN F. WILDMAN.

Witnesses:
JAMES H. HORLE,
COLLINS WILDMAN.